(12) United States Patent
Watfa et al.

(10) Patent No.: US 12,507,165 B2
(45) Date of Patent: Dec. 23, 2025

(54) NETWORK SLICE-SPECIFIC AUTHENTICATION AND AUTHORIZATION (NSSAA)

(71) Applicant: Samsung Electronics Co., Ltd., Suwon-si (KR)

(72) Inventors: Mahmoud Watfa, Middlesex (GB); Kundan Tiwari, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 385 days.

(21) Appl. No.: 18/022,027

(22) PCT Filed: Aug. 20, 2021

(86) PCT No.: PCT/KR2021/011134
§ 371 (c)(1),
(2) Date: Feb. 17, 2023

(87) PCT Pub. No.: WO2022/039558
PCT Pub. Date: Feb. 24, 2022

(65) Prior Publication Data
US 2023/0362800 A1    Nov. 9, 2023

(30) Foreign Application Priority Data

Aug. 20, 2020  (IN) .............................. 202031035947
Aug. 19, 2021  (GB) ..................................... 2111892

(51) Int. Cl.
*H04W 48/18*    (2009.01)
*H04W 12/06*    (2021.01)

(52) U.S. Cl.
CPC .......... *H04W 48/18* (2013.01); *H04W 12/06* (2013.01)

(58) Field of Classification Search
CPC ..... H04W 48/18; H04W 12/06; H04W 48/02; H04W 48/08; H04W 60/04; H04W 88/14; H04W 12/08; H04W 60/00; H04W 88/18
See application file for complete search history.

(56) References Cited

U.S. PATENT DOCUMENTS

| 9,392,000 | B2 * | 7/2016 | Shaikh | ................ | H04W 12/068 |
| 2013/0074149 | A1 * | 3/2013 | Shaikh | ................ | H04W 12/068 |
| | | | | | 726/3 |

(Continued)

FOREIGN PATENT DOCUMENTS

| CN | 103200159 B | 6/2016 |
| GB | 2593147 A | 9/2021 |

(Continued)

OTHER PUBLICATIONS

3GPP; 5G; System architecture for the 5G System (5GS) (3GPP TS 23.501 version 16.5.1 Release 16); ETSI TS 123 501; V16.5.1; Sep. 2020; France.

(Continued)

*Primary Examiner* — Brandon J Miller
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). Disclosed is a method of performing Network Slice-Specific Authentication and Authorization, NS SAA, in a telecommunication network, for at least one network slice, such that a given user is able to access the at least one network slice, S-NSSAI, comprising the step of performing NSSAA after a specified time period, T, has elapsed.

15 Claims, 2 Drawing Sheets

(56) References Cited

U.S. PATENT DOCUMENTS

| | | | |
|---|---|---|---|
| 2020/0053083 A1* | 2/2020 | Kunz | ............... H04W 12/72 |
| 2020/0162919 A1* | 5/2020 | Velev | ............... H04W 60/00 |
| 2020/0344647 A1* | 10/2020 | Zhu | ............ H04W 36/14 |
| 2022/0295279 A1 | 9/2022 | Kuge | |

FOREIGN PATENT DOCUMENTS

| | | |
|---|---|---|
| GB | 2595751 A | 12/2021 |
| GB | 2596897 A | 1/2022 |
| WO | 2020/104969 A1 | 5/2020 |
| WO | 2021/015199 A1 | 1/2021 |

OTHER PUBLICATIONS

3GPP; 5G; Procedures for the 5G System (5GS) (3GPP TS 23.502 version 16.5.1 Release 16); ETSI TS 123 502; V16.5.1; Sep. 2020; France.

3GPP; 5G; Non-Access-Stratum (NAS) protocol for 5G System (5GS); Stage 3 (3GPP TS 24.501 version 16.5.1 Release 16); ETSI TS 124 501; V16.5.1; Aug. 2020; France.

Huawei et al.; Discussion on validity period of NSSAA results; 3GPP TSG-SA3 Meeting #100e; S3-201812; Revision of S3-20xxxx; Aug. 17-28, 2020; e-meeting.

Samsung; Missing condition for inclusion of "NSSAA to be performed" indicator; 3GPP TSG-CT WG1 Meeting #123-e; C1-202629; rev of C1-202121; Apr. 16-24, 2020; Electronic meeting.

Apple; Sending of NSSAA Complete message when UE does not yet have allowed NSSAI; 3GPP TSG-CT WG1 Meeting #125-e; C1-205022; Aug. 20-28, 2020; Electronic meeting.

Catt; Ki #5, New Sol: UE-Slice-AMBR adjustment to meet the limitation of data rate per Network Slice; 3GPP TSG-SA WG2 Meeting #139E; S2-2004077; (revision of S2-200xxxx); Jun. 1-12, 2020; Elbonia.

International Search Report with Written Opinion dated Nov. 19, 2021; International Appln. No. PCT/KR2021/011134.

United Kingdom Office Action dated Feb. 10, 2022; United Kingdom Appln. No. 2111892.2.

European Search Report dated Nov. 27, 2023, issued in European Application No. 21858645.1.

Interdigital Inc., TS 23.502: Support for Slice-Specific authentication and authorization, 3GPP TSG-SA2 Meeting #132, S2-1903707, XP 51719853 A, Apr. 12, 2019.

European Decision to Grant dated Mar. 24, 2025, issued in European Application No. 21858645.1.

* cited by examiner

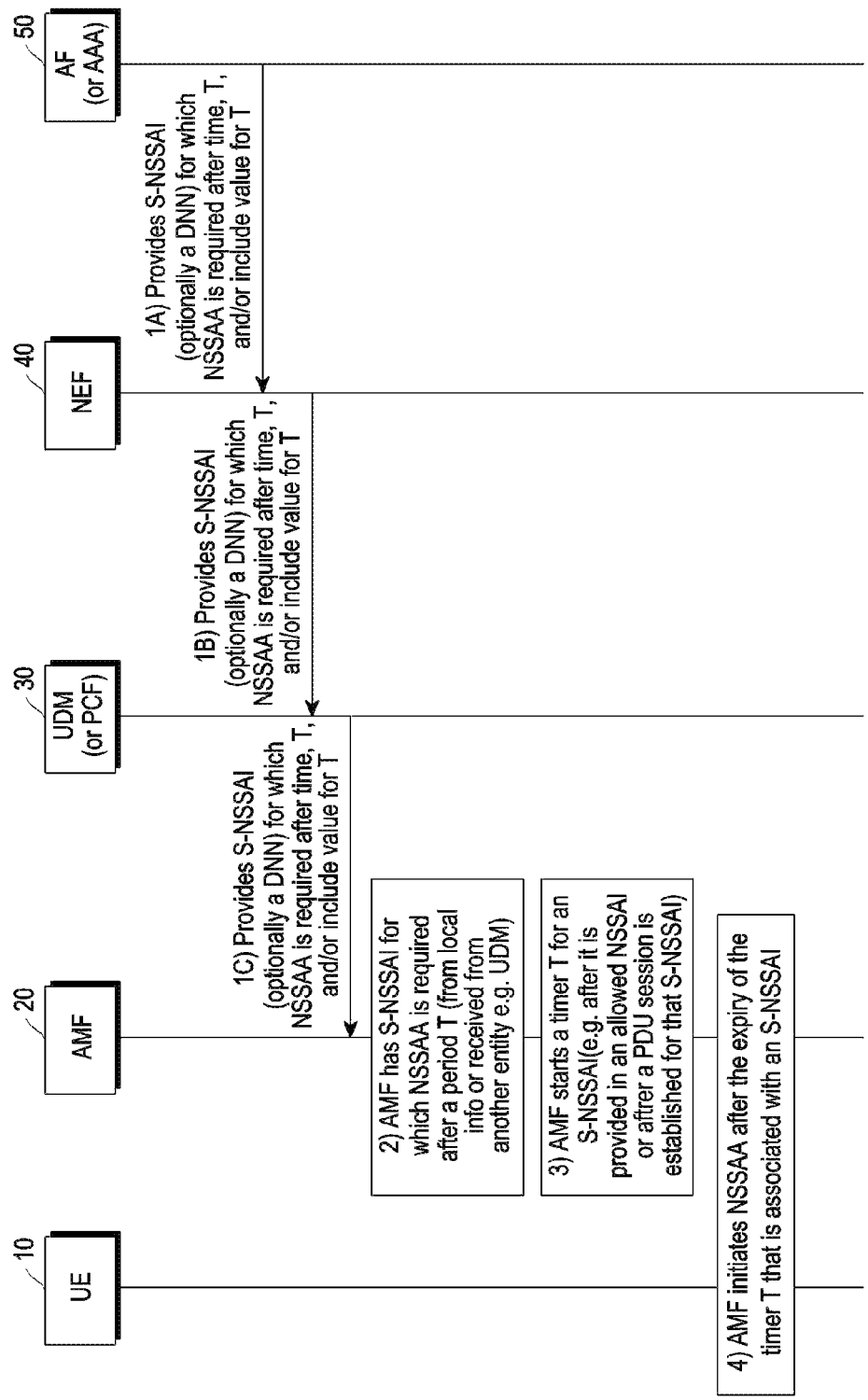

[Fig. 2]
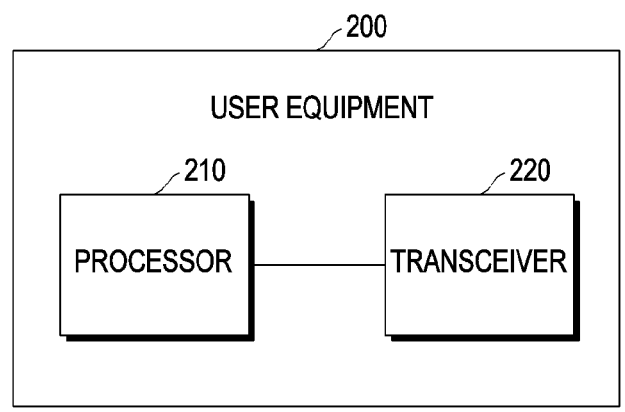
[Fig. 3]
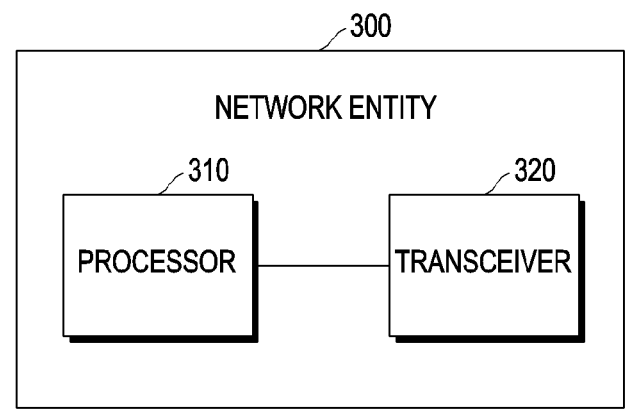

NETWORK SLICE-SPECIFIC AUTHENTICATION AND AUTHORIZATION (NSSAA)

CROSS-REFERENCE TO RELATED APPLICATION(S)

This application is a U.S. National Stage application under 35 U.S.C. § 371 of an International application number PCT/KR2021/011134, filed on Aug. 20, 2021, which is based on and claims priority of a Indian patent application number 202031035947, filed on Aug. 20, 2020, in the Indian Intellectual Property Office, and of a United Kingdom patent application number 2111892.2, filed on Aug. 19, 2021, in the United Kingdom Intellectual Property Office, the disclosure of each of which is incorporated by reference herein in its entirety.

TECHNICAL FIELD

The present invention relates to Network Slice-Specific Authentication and Authorization (NSSAA). NSSAA is a known feature in Fifth Generation (5G) telecommunication networks. The feature enables the network to perform slice-specific authentication and authorization for a set of network slices, identified by Network Slice Selection Assistance Information (S-NSSAI(s)), to ensure that the user is allowed to access these slices. The procedure is executed after the 5GMM (5G Mobility Management) authentication procedure has been completed and also after the registration procedure completes. Note that S-NSSAI is used to uniquely identify a Network Slice. The S-NSSAI contains two components: the SST (Slice/Service Type) and an optional SD (Slice Differentiator).

BACKGROUND ART

To meet the demand for wireless data traffic having increased since deployment of 4G communication systems, efforts have been made to develop an improved 5G or pre-5G wireless communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

According to the present invention there is provided an apparatus and method as set forth in the appended claims. Other features of the invention will be apparent from the dependent claims, and the description which follows.

According to a first aspect of the present invention, there is provided a method of performing Network Slice-Specific Authentication and Authorization, NSSAA, in a telecommunication network, for at least one network slice, such that a given user is able to access the at least one network slice, S-NSSAI, comprising the step of performing NSSAA after a specified time period, T, has elapsed.

In an embodiment, a time before the specified time period, T, has elapsed corresponds to a free trial period during which the give user is permitted access to the at least one network slice without NSSAA being performed.

In an embodiment, the specified time period, T, is configured in the telecommunication network in or more of the AMF the UDM or an AF or a UE.

In an embodiment, the network is configured with details of each S-NSSAI for which NSSAA is required after the specified time period, T.

In an embodiment, the specified time period, T, begins for each S-NSSAI: when the S-NSSAI in question is first sent to the UE in the allowed NSSAI; or when the UE establishes a new Protocol Data Unit (PDU) session with the S-NSSAI in question; or when a new PDU session is established with an S-NSSAI that is selected by the AMF.

In an embodiment, the specified period of time, T, is altered, even if a time associated with the specified period of time has started.

In an embodiment, after the expiry of the specified period of time, T, a UE initiates a registration procedure and requests to use each S-NSSAI for which the timer has expired.

According to a second aspect of the present invention, there is provided apparatus arranged to perform the method of the first aspect.

According to a third aspect of the present invention, there is provided a method performed by a network entity in a wireless communication network, the method comprising: identifying Single-Network Slice Selection Assistance Information (S-NSSAI) indicating that Network Slice-Specific Authentication and Authorization (NSSAA) is required after a time period; and performing the NSSAA after the time period.

In an embodiment, a time before the time period has elapsed corresponds to a free trial period during which a user equipment (UE) is permitted to access at least one network slice without the NSSAA being performed.

In an embodiment, the S-NSSAI is provided by at least one of access and mobility management function (AMF), a unified data management (UDM), an application function (AF), or a user equipment (UE).

In an embodiment, the method further comprises identifying a data network name (DNN) provided by at least one of an access and mobility management function (AMF), a unified data management (UDM), an application function (AF), or a user equipment (UE).

In an embodiment, the time period begins for each S-NSSAI: when the S-NSSAI in question is first sent to the UE in an allowed NSSAI; or when the UE establishes a new protocol data unit, (PDU) session with the S-NSSAI in question; or when a new PDU session is established with an S-NSSAI that is selected by the AMF.

In an embodiment, the time period is changed.

In an embodiment, after the time period, a user equipment (UE) initiates a registration procedure with the network entity and requests to the network entity to use each S-NSSAI for which a timer has expired.

According to a fourth aspect of the present invention, Network entity in a wireless communication network, the apparatus comprising: transceiver; and at least one processor; the at least one processor is configured to: identifying Single-Network Slice Selection Assistance Information (S-NSSAI) indicating that Network Slice-Specific Authentication and Authorization (NSSAA) is required after a time period; and performing the NSSAA after the time period.

Although a few preferred embodiments of the present invention have been shown and described, it will be appreciated by those skilled in the art that various changes and modifications might be made without departing from the scope of the invention, as defined in the appended claims.

DESCRIPTION OF DRAWINGS

For a better understanding of the invention, and to show how embodiments of the same may be carried into effect, reference will now be made, by way of example only, to the accompanying diagrammatic drawings in which:

FIG. 1 shows a message flow according to an embodiment of the present invention.

FIG. 2 shows various hardware components of the UE (200) in the wireless communication system, according to an example embodiment as disclosed herein.

FIG. 3 shows various hardware components of the network entity (300) in the wireless communication system, according to an example embodiment as disclosed herein.

MODE FOR INVENTION

Key features of the known NSSAA procedure are:
NSSAA applies to both the 3GPP access and the non-3GPP access and is, in fact, access agnostic
When a set of slices, each of which is identified by an S-NSSAI, is subject to NSSAA during registration procedure, the Access and Mobility Management Function (AMF) will send the pending NSSAI to the User Equipment (UE) in the Registration Accept message indicating those S-NSSAIs for which NSSAA will be performed (or for which NSSAA is needed)
The AMF, due to a need to perform NSSAA, may not send an allowed NSSAI to the UE in the Registration Accept message. In this case, the AMF sets the "NSSAA to be performed" indicator in the 5GS registration result Information Element (IE) set to "Network slice-specific authentication and authorization is to be performed", in addition to sending the pending NSSAI to the UE
There are some cases in which the UE may be allowed to use some slices without needing to run NSSAA again e.g. because the slices don't require NSSAA, or the slices have been subject to NSSAA already. In this case, the AMF will send the allowed NSSAI in the Registration Accept message, where the allowed NSSAI contains those S-NSSAIs for which NSSAA is not required. However, there may be other slices that do require NSSAA for which the AMF will send the pending NSSAI in the Registration Accept message, where the pending NSSAI contains the S-NSSAIs that require NSSAA
It is also possible that the AMF can perform re-authentication and re-authorization for an S-NSSAI for which NSSAA has already been performed successfully. For example, during initial registration, the AMF performs NSSAA for an S-NSSAI that eventually succeeds the procedure and is included in the allowed NSSAI for the UE. Although this S-NSSAI is in the allowed NSSAI, the network may at any time perform re-authentication and re-authorization for this S-NSSAI. Note that this determination may be due to an AMF policy or may be triggered by an AAA (Authentication, Authorization and Accounting) server that can be owned/hosted by a third-party service provider e.g. one which offers streaming services.

A problem with the prior art NSSAA functionality is that is has not considered cases of free trial periods i.e. periods of free access to slice-specific services or functions.

It is a common practice that service providers, and especially those that offer streaming services, allow a free trial period for a user to try their services. This trial period varies from one service provider to another and may be in the order of hours, days, or months. When the trial period expires, the service is stopped if the user elects not to pay or subscribe to get the service. Alternatively, the service is maintained if the user chooses to pay for or subscribe to the service.

Network slice-specific authentication and authorization (NSSAA) may be used to enable the control of authorized users to gain access to a service. However, NSSAA has not been arranged to allow free trial periods. Moreover, there is no definition of how the network can initiate NS SAA after the free trial period expires and when exactly to make such a determination that the trial period has indeed expired.

It is an aim of embodiments of the present invention to address the shortcomings referred to above.

The network may be configured to run NSSAA after a period of time T where, for example, the time T represents a free trial period or any other time during which NSSAA may not be required for other reasons or based on operator/network policies. The time period T is arranged to allow a user to sample certain services without undergoing NSSAA.

The network may be configured with every S-NSSAI for which NSSAA is required after a time T. The configuration may be in the AMF, in the Unified Data Management (UDM), or any other logical entity in the 5G system. Alternatively, an application function (AF) or application server (AS) may indicate, e.g. via an API that is used for service exposure, which S-NSSAI is subject to a trial period and hence may be subject to running NSSAA after the trial period T ends.

The API may be an API of the Network Exposure Function (NEF) that can be invoked or used by the AF or AS.

Note that herein, the S-NSSAI in question may be associated with no Data Network Name (DNN) or may be associated with a DNN. Hence, the embodiments herein apply to an S-NSSAI that may not be associated with a DNN or to an S-NSSAI that may be associated with a DNN. Hence, all references to configurations or indication, etc, may also include DNN information or no DNN information. As such, the term "S-NSSAI" may refer to an S-NSSAI with no DNN, or may refer to an S-NSSAI that is associated with a specific DNN.

The AMF may be configured with each S-NSSAI for which NSSAA is required after a period of time, T. This configuration may be local or may be provided by another network entity such as, but not limited to, the UDM or Policy Control Function (PCF). For example, the UDM may provide the AMF with each S-NSSAI for which NSSAA may be required after a time T. This information may be in the form of a new indication or parameter that is associated with an S-NSSAI which may be part of the subscription information of a UE or user. The configuration information may also contain the length of the time T for each S-NSSAI that requires NSSAA after the time T expires.

Note that reference herein to UDM is exemplary, but the use of the UDM is not to be considered a limitation or a restriction of embodiments of the invention to the UDM only. Embodiments may equally utilise to one or more other entities in the network such as, but not limited to, the PCF.

Note that the time T may be started at the AMF for each S-NSSAI as follows:
- When the S-NSSAI in question is first sent to the UE in the allowed NSSAI (i.e. when the AMF first allows the use of the S-NSSAI for the UE)
- When the UE establishes a new Protocol Data Unit (PDU) session with the S-NSSAI in question
- When a new PDU session is established with an S-NSSAI that is selected by the AMF, e.g. when the UE does not include a selected S-NSSAI, and the AMF has a configuration that requires the run of NSSAA for the selected S-NSSAI after a time T expires. The selected S-NSSAI may be a default S-NSSAI.

The length of the timer T may change even if the timer has already started. The change in the length of the timer T may be based on local policies or may be based on a change in subscription information that leads the UDM to provide an updated timer T for an S-NSSAI in question. If the value of the timer T is less than the time that has already elapsed for this timer, then the AMF may determine to stop the current timer and initiate NSSAA immediately. If the value of the updated timer is longer than the previous value, the AMF may adjust the value of the current timer e.g. by resetting and starting it with an adjusted value. In any case, the AMF may adjust the timer T based on local information or a new value that is received from the UDM.

The change in the length of the timer T may also be requested, and hence the updated value may be provided, by the AF or AF towards a network entity such as the NEF, where the updated value is associated with an S-NSSAI.

Upon expiry of the timer T at the AMF, the AMF may initiate NSSAA for the S-NSSAI in question. The NSSAA procedure may be performed if the UE has a PDU session that is established for this S-NSSAI, or it may be performed even if the UE does not have a PDU session that is established for this S-NSSAI.

After the completion of the NSSAA procedure, the AMF can update the UE's allowed NSSAI accordingly, if needed. For example, if NSSAA fails for the S-NSSAI, the AMF removes the S-NSSAI from the allowed NSSAI and provides an updated allowed NSSAI to the UE. The S-NSSAI for which NSSAA has failed should be sent in the rejected NSSAI. The AMF may include a new cause code to indicate the failure of NSSAA after a free trial period or may indicate that the free trial period has ended for this S-NSSAI. If there exists a PDU session for the S-NSSAI that failed NSSAA, the AMF can initiate the release of the PDU session and may indicate a new cause code to the Session Management Function (SMF) as set out above.

In an alternative embodiment, the AAA or the AS/AF may be the entity that starts a timer for the S-NSSAI or for the UE in question when the PDU session is first established. Upon expiry of the timer, the AAA or AS/AF can initiate NSSAA for the S-NSSAI and UE. This can be done by either sending an Extensible Authentication Protocol (EAP) message directly for NSSAA (as known in the prior art) or the AS/AF can use the NEF to trigger NSSAA for the S-NSSAI and UE in question. The NEF, in turn, propagates the request to the UDM or PCF which, in turn, propagate the trigger to run NSSAA to the AMF. In one alternative, if the UE already has a PDU session for the S-NSSAI in question, the AMF may be configured to first release the PDU session before running the NSSAA procedure. Alternatively, the AMF first determines the result of the NSSAA procedure and if it is successful then the PDU session is maintained (if one was already established), or if it is not successful then the PDU session is released by the AMF (or at least the AMF requests the corresponding SMF to release the PDU session that is associated with the S-NSSAI for which the NSSAA procedure was not successful).

In another alternative solution, when the AMF first provides an allowed NSSAI to the UE, then for each S-NSSAI that is associated with a free trial period, the AMF may indicate that the S-NSSAI is subject to a free trial period and implicitly/explicitly is subject to NSSAA after the timer expires. The timer may be the same value for all the slices or it may be per an S-NSSAI. The UE may start a timer for the slices or for each S-NSSAI to guard the period of the free trial. After the expiry of the timer, the UE may perform a registration procedure and request the S-NSSAI for which the trial period has expired. This then triggers the AMF to perform NSSAA as usual and updates the UE with the appropriate allowed NSSAI based on the outcome of the NSSAA procedure. If the UE already has a PDU session that is established for such an S-NSSAI, the UE may first initiate the release of the PDU session or may keep it. If the UE initiates the release, it may do so locally or by sending the appropriate 5GSM NAS message to the network e.g. PDU Session Release Request.

When the AMF receives a request to initiate NSSAA for an S-NSSAI (for a particular UE, or for all UEs), the AMF can initiate NSSAA for the S-NSSAI in question with at least one UE for which this S-NSSAI has been allowed.

Note that the various features disclosed herein can be applied in any order and in any combination.

FIG. 1 shows an example message flow according to an embodiment of the present invention. Various Network entities are shown, including UE 10, AMF 20, UDM 30, NEF 40 and AF 50. As mentioned previously, some functions may be performed by different network entities. For instance, the functions of the UDM 30 set out here may be performed by PCF. Similarly, the functions of AF 50 may be performed by AAA.

Steps 1A to 1C: the AMF 20 may be configured with an S-NSSAI and optionally a DNN and optionally a timer T after which NSSAA should be performed. This may be provided by the AF 50 to the NEF 40 (step 1A) and the NEF 40 may provide this to the UDM 30 (or PCF, in step 1B). The UDM 30, either based on local configuration or subscription change or based on a request from the AF 50 via an NEF 40, may determine to inform the AMF 20 (Step 1C) about an S-NSSAI for which NSSAA is required after a duration or time interval T. The UDM 30 may provide an associated DNN and optionally a value for the timer T.

Step 2: the AMF 20 has information, either based on local configuration or based on information received from a network entity such as the UDM 30 or PCF, about which S-NSSAI requires NSSAA after a time T, where the value of T may also be known as described herein.

Step 3: the AMF 20 starts a timer with value T where this timer is started e.g. when the S-NSSAI in question is provided to the UE 10 in the allowed NSSAI, or when a PDU session is established with the associated S-NSSAI.

Step 4: upon expiry of the timer T, the AMF 20 initiates NSSAA for the S-NSSAI in question.

Although not shown in FIG. 1, other alternatives for triggering NSSAA may also be possible such as one that may be triggered by a request from the AF via the NEF, which has been described herein, previously.

FIG. 2 shows various hardware components of the UE (200) in the wireless communication system, according to various embodiments as disclosed in this application. The UE (200) can be, for example but not limited to a cellular phone, a tablet, a smart phone, a laptop, a Personal Digital Assistant (PDA), a global positioning system, a multimedia device, a video device, an internet of things (IoT) device, a smart watch, a game console, a smart watch, a foldable display device, an Unmanned Aerial Vehicle (UAV), an airplane or the like. The UE (200) may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like.

In an example embodiment, the UE (200) includes at least one processor (210) and transceiver (220). The at least one processor (210) is coupled with the transceiver (220). The at least one processor (210) is configured to perform various processes. The transceiver (220) is configured for communicating internally between internal hardware components and with external devices via one or more networks.

Although the FIG. 2 shows various hardware components of the UE (200) but it is to be understood that other example embodiments are not limited thereto. In other example embodiments, the UE (200) may include less or more components. Further, the labels or names of the components are used only for illustrative purposes.

FIG. 3 shows various hardware components of the network entity (300) in the wireless communication system, according to various embodiments as disclosed in this application.

The network entity comprises various network function entities in core network (e.g. 5G CORE). The network entity (300) includes at least one of AMF(Access and Mobility Management Function), SMF(Session Management Function), UDM(Unified Data Management), NEF(Network Exposure Function), AUSF(Authentication Server Function), AAA(Authentication, Authorization, and Accounting) Server, AF(Application Function), and/or base station.

In an example embodiment, the network entity (300) includes at least one processor (310) and transceiver (320). The at least one processor (310) is coupled with the transceiver (320). The at least one processor (310) is configured to perform various processes. The transceiver (320) is configured for communicating internally between internal hardware components and with external devices via one or more networks.

Although the FIG. 3 shows various hardware components of the network entity (300) but it is to be understood that other example embodiments are not limited thereto. In other example embodiments, the network entity (300) may include less or more components. Further, the labels or names of the components are used only for illustrative purposes.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by an access and mobility management function (AMF) entity in a wireless communication network, the method comprising:
   identifying at least one single-network slice selection assistance information (S-NSSAI) indicating that network slice-specific authentication and authorization (NSSAA) is required after a time period;
   initiating a timer associated with the time period for each of the at least one S-NSSAI;
   allowing a user equipment, UE, to access at least one network slice related to the at least one S-NSSAI without the NSSAA, before the timer associated with the time period expires; and
   performing the NSSAA on the at least one network slice after the timer expires.

2. The method of claim 1, wherein the timer associated with the time period corresponds to a free trial period during which the UE is permitted to access the at least one network slice without the NSSAA being performed.

3. The method of claim 1, wherein the S-NSSAI is preconfigured or provided by at least one of a unified data management (UDM), an application function (AF), or a second UE.

4. The method of claim 3, wherein the timer is initiated for each of the at least one S-NSSAI:
   in case that the at least one S-NSSAI is first transmitted to the UE, in an allowed NSSAI, or
   in case that a new protocol data unit (PDU) session is established with the at least one S-NSSAI, or
   in case that a new PDU session is established with an S-NSSAI that is selected by the AMF.

5. The method of claim 1, further comprising:
   identifying a data network name (DNN) provided by at least one of a unified data management (UDM), an application function (AF), or a second UE.

6. The method of claim 1, further comprising:
   changing a length of the time period after the time period is initiated.

7. The method of claim 1, further comprising:
   performing a registration procedure which is initiated by the UE after the time period; and
   receiving, from the UE, requests to use each of the at least one S-NSSAI for which the timer has expired.

8. An access and mobility management function (AMF) entity in a wireless communication network, the AMF entity comprising:
   a transceiver;
   memory, comprising one or more storage media, storing instructions; and
   at least one processor communicatively coupled to the transceiver and the memory,
   wherein the instructions, when executed by the at least one processor individually or collectively, cause the AMF entity to:
      identify at least one single-network slice selection assistance information (S-NSSAI) indicating that network slice-specific authentication and authorization (NSSAA) is required after a time period,
      initiate a timer associated with the time period for each of the at least one S-NSSAI,
      allow a user equipment (UE) to access at least one network slice related to the at least one S-NSSAI without the NSSAA, before the timer associated with the time period expires, and
      perform the NSSAA on the at least one network slice after the timer expires.

9. The AMF entity of claim 8, wherein the timer corresponds to a free trial period during which the UE is permitted to access the at least one network slice without the NSSAA being performed.

10. The AMF entity of claim 8, wherein the S-NSSAI is preconfigured or provided by at least one of a unified data management (UDM), an application function (AF), or a second UE.

11. The AMF entity of claim 10, wherein the timer is initiated for each of the at least one S-NSSAI:
   in case that the at least one S-NSSAI is first transmitted to the UE, in an allowed NSSAI, or
   in case that a new protocol data unit (PDU) session is established with the at least one S-NSSAI, or
   in case that a new PDU session is established with an S-NSSAI that is selected by the AMF.

12. The AMF entity of claim 8, wherein the instructions, when executed by the at least one processor individually or collectively, further cause the AMF entity to identify a data network name (DNN) provided by at least one of a unified data management (UDM), an application function (AF), or a second UE.

13. The AMF entity of claim 8, wherein the instructions, when executed by the at least one processor individually or collectively, further cause the AMF entity to:
   change a length of the time period after the time period is initiated.

14. The AMF entity of claim 8, wherein the instructions, when executed by the at least one processor individually or collectively, further cause the AMF entity to:
   perform a registration procedure which is initiated by the UE; and
   receive, from the UE, requests to use each of the at least one S-NSSAI for which the timer has expired.

15. The AMF entity of claim 8, wherein the S-NSSAI includes a slice/service type (SST) information and a slice differentiator (SD).

* * * * *